US012621511B2

(12) United States Patent
Knott et al.

(10) Patent No.: US 12,621,511 B2
(45) Date of Patent: May 5, 2026

(54) YUV 4:4:4 ENCODING USING CHROMA SUBSAMPLING

(71) Applicants: ATI TECHNOLOGIES ULC, Markham (CA); ADVANCED MICRO DEVICES, INC., Santa Clara, CA (US)

(72) Inventors: Isabelle Elizabeth Knott, Toronto (CA); Mikhail Mironov, Richmond Hill (CA); Gennadiy Kolesnik, Richmond Hill (CA); Andrzej Maciej Okenczyc, Pmorskie (PL)

(73) Assignees: Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 159 days.

(21) Appl. No.: 18/525,382

(22) Filed: Nov. 30, 2023

(65) Prior Publication Data

US 2025/0184548 A1     Jun. 5, 2025

(51) Int. Cl.
    *H04N 21/234*    (2011.01)
    *H04N 21/2343*    (2011.01)
    *H04N 21/4402*    (2011.01)
(52) U.S. Cl.
    CPC ..... *H04N 21/2343* (2013.01); *H04N 21/4402* (2013.01)
(58) Field of Classification Search
    CPC ........................ H04N 21/2343; H04N 21/4402
    USPC ..................................................... 375/240.01
    See application file for complete search history.

(56) References Cited

U.S. PATENT DOCUMENTS

| | | | | |
|---|---|---|---|---|
| 7,809,061 | B1 * | 10/2010 | Sarna ................. | H04N 21/2662 |
| | | | | 375/240.16 |
| 8,958,474 | B2 | 2/2015 | Malladi | |
| 2010/0278271 | A1 * | 11/2010 | MacInnis ............. | H04N 19/174 |
| | | | | 375/240.18 |
| 2013/0243076 | A1 * | 9/2013 | Malladi ................. | H04N 1/646 |
| | | | | 375/E7.026 |

(Continued)

FOREIGN PATENT DOCUMENTS

| | | | | | |
|---|---|---|---|---|---|
| KR | 20240090148 | A | * | 6/2024 | ............. A63F 13/35 |

OTHER PUBLICATIONS

U.S. Appl. No. 18/525,411, filed Nov. 30, 2023, listing Gennadiy Kolesnik et al. as inventors, entitled "Motion-Based Hybrid Chroma Subsampling".

*Primary Examiner* — Behrooz M Senfi

(57) ABSTRACT

A system provides YUV 4:4:4 encoding support in the presence of an encoder or decoder that does not provide native YUV 4:4:4 encoding by generating, at a source device, a plurality of subframes from an input image of a video stream such that each subframe includes a copy of the luminance plane of the input image and a different subset of the chrominance plane of the image plane after chroma subsampling during the encoding process. After decoding the plurality of subframes, a sink device can extract a copy of the luminance plane from one of the subframes and replicate the chrominance plane by compositing the different subsets of the chrominance plane from the plurality of decoded subframes, thereby generating an output image with the same chrominance resolution as the input image even though the individual subframes were subjected to sub-4:4:4 chroma sampling during the encoding process.

26 Claims, 12 Drawing Sheets

(56)                     References Cited

U.S. PATENT DOCUMENTS

| 2024/0348797 A1* | 10/2024 | Mahdi | .................. | H04N 19/115 |
| 2025/0063207 A1* | 2/2025 | Wu | ........................ | H04N 19/59 |

\* cited by examiner

YUV 4:4:4 ENCODING USING CHROMA SUBSAMPLING

BACKGROUND

While captured video imagery and computer-rendered video imagery typically is generated using a red-blue-green (RGB) or similar color space and is also displayed using an RGB color space, the encoding of such video imagery often utilizes a color space conversion to a luminance-chrominance, or YUV, color space in order to take advantage of certain characteristics of the human vision system (HVS). A YUV color space specifies, for each pixel or other picture element, a luminance component (Y) and two differential chrominance components: blue projection (U) and red projection (V) (and from the combination of which the green chrominance can be calculated). The array of Y components for an image (the "Y plane") thus is a monochrome representation of the image, and the arrays of U and V components for the image (collectively, the "UV plane") thus represent the color information for the image.

In the HVS, color information (chrominance) is processed at a much lower resolution than luminance. Accordingly, many video encoding/decoding systems leverage this disparity for improved encoding efficiency by subsampling the chrominance information while still maintaining high decoded image quality. For example, in a YUV 4:2:2 encoding scheme, the full luminance resolution is maintained (as indicated by the first "4" in "4:2:2") while only one-half of the chrominance resolution is maintained (as indicated by the "2:2" in "4:2:2"), typically by maintaining all rows of the UV plane but only one-half of the columns of the UV plane, and thus reducing the total amount of image data to be encoded by one-fourth. Still further, in a YUV 4:2:0 encoding scheme, the full luminance resolution is maintained while only one-fourth of the chrominance resolution is maintained (as indicated by the "2:0" in "4:2:0"), typically by maintaining only one-half of the rows and one-half of the columns of the UV plane, and thus reducing the total amount of image data to be encoded by three-eighths.

YUV 4:2:2 and YUV 4:2:0 subsampling often yield an acceptable user experience for display of video with considerable motion (as the HVS does not have enough time to process the details) or with video content with slowly-changing colors and relatively few sharp edges. However, the negative impact of such chrominance subsampling on certain kinds of video content, such as the display of text (and particularly when on a colored background) or the display of imagery with many fine lines (such as certain types of art or technical drawings), becomes perceptible to users and thus results in a degraded user experience.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Figure 1:
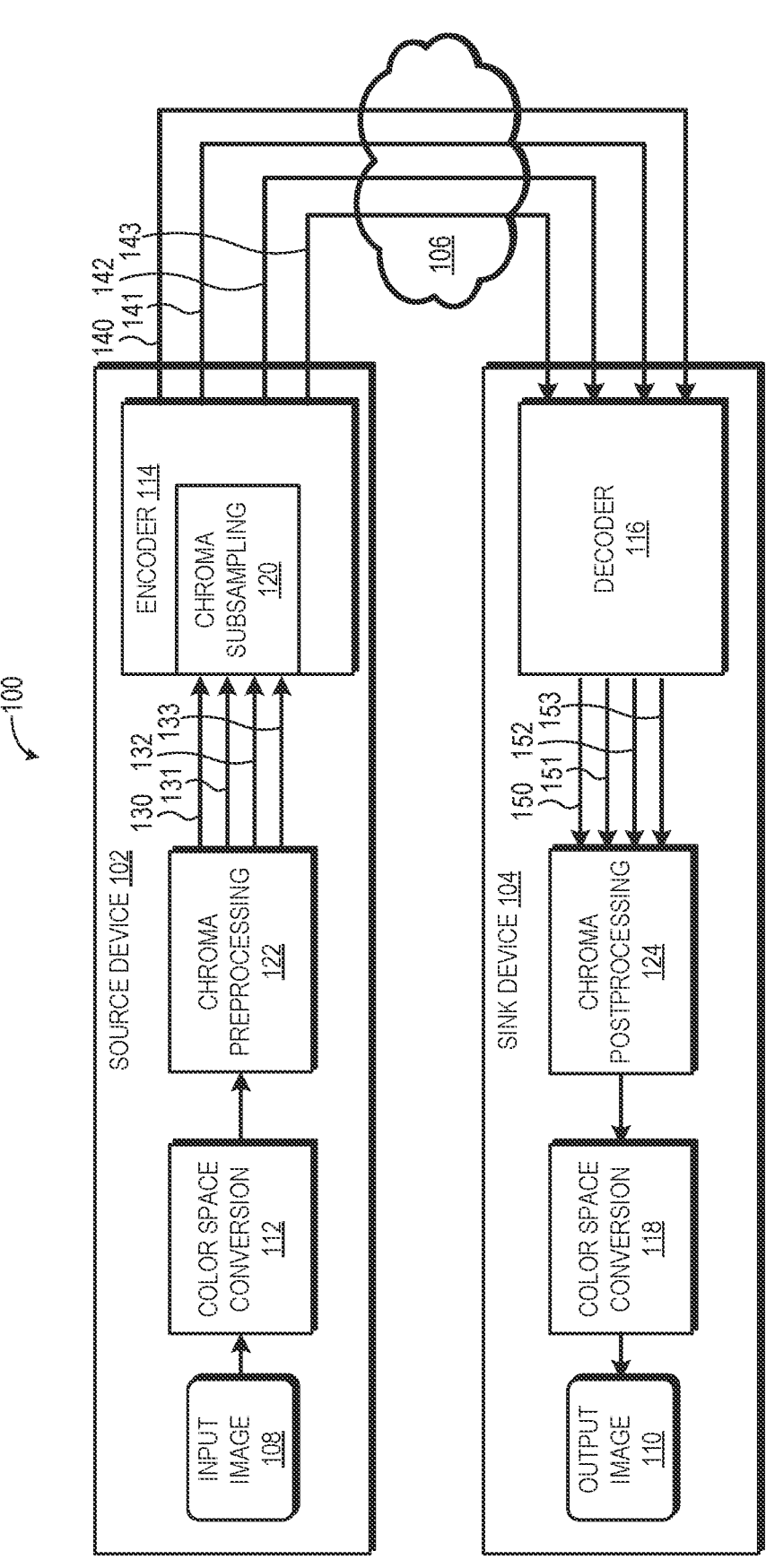
FIG. 1 is a block diagram of a video system that provides support for YUV 4:4:4 encoding for a native sub-4:4:4 codec in accordance with some implementations.

YUV 4:2:2 and 4:2:0 encoding schemes (referred to herein collectively as "sub-4:4:4 encoding") provide advantageous reductions in the amount of image data to be encoded, transmitted, and decoded, at the expense of reduced chrominance resolution. In many instances, this reduced chrominance resolution has little impact on the perceived display quality of the video content due to the human vision system's reduced sensitivity to chrominance (or "chroma" for short) compared to luminance. However, certain image content, such as the aforementioned text content or fine line content, suffers from chroma subsampling. In such instances, full YUV 4:4:4 encoding would be employed. However, some video systems only have native support for sub-4:4:4 encoding. For example, a source device that operates to encode video content and transmit the resulting encoded video content may employ a hardware encoder that only natively supports 4:2:2 or 4:2:0 encoding; that is, is configured to always apply chroma subsampling or to accept only chroma-subsampled inputs. As another example, a sink device that operates to receive encoded video content and then decode the encoded video content to recover a representation of the original video content for display or for further processing may employ a software-based decoder that only natively supports 4:2:2 or 4:2:0 decoding. In such systems, YUV 4:4:4 video cannot be successfully encoded and decoded to recover YUV 4:4:4 video content.

The following describes implementations of systems and methods for providing YUV 4:4:4 support in a video system in which one or both of the encoder or decoder have only native support for sub-4:4:4 encoding/decoding through a process referred to herein as subframe-based chroma subsampling. In implementations, the subframe-based chroma subsampling scheme operates to effectively induce YUV 4:4:4 encoding/decoding end-to-end even when one or both of the encoder circuit or decoder circuit are limited to sub-4:4:4 encoding by generating, at a source device, multiple subframes from the YUV data for an input image to be encoded. Each subframe contains the full luminance resolution (that is, a copy of the entire Y plane) of the image, and a different subset of the chroma resolution (for example, a separate corresponding portion of the UV plane), wherein each different subset of the chroma resolution differs from the other subsets of the chroma resolution by at least one chroma value of the chroma resolution. Each subframe then is processed independently by the encoder as though it were a separate chroma subsampled image, with the result being a different encoded video bitstream (or portion thereof) that contains an encoded representation of the entire Y plane and a corresponding separate portion of the UV plane of the original image. As only a subsample of the full chrominance resolution is present in each subframe, each subframe can be properly encoded by an encoder that natively supports only sub-4:4:4 encoding.

The encoded bitstream(s) are transmitted to a sink device, whereby a decoder circuit decodes the encoded bitstream(s) to recover multiple copies of the full Y plane and a copy of each of the respective portions of the UV plane included in each encoded subframe represented in the corresponding bitstream. As each subframe has less than full chrominance resolution, the corresponding encoded bitstream can be decoded by a decoder that only natively supports sub-4:4:4 decoding to generate a decoded subframe. A post-decoding process then operates to regenerate a representation of the original image by utilizing the decoded full Y plane from one of the decoded subframes and by compositing the full UV plane from the individual respective UV plane portions obtained from the decoded subframes. Thus, a YUV 4:4:4 image can effectively be encoded and decoded in a system having one or more components in the pipeline that are limited to native support of only sub-4:4:4 encoding/decoding through generation of multiple subframes from the original YUV plane that each have less than full chroma resolution and thus can be properly handled by every stage in the pipeline.

In the following, reference is made to "circuit," which should be understood to reference any or a combination of a hardcoded circuit (e.g., a corresponding portion of an application specific integrated circuit (ASIC), a programmable circuit (e.g., a corresponding portion of a field programmable gate array (FPGA) or programmable logic device (PLD), or one or more processors executing software instructions that cause the one or more processors to implement the ascribed actions. Reference also is made to "YUV", which shall be understood to refer to any of a variety of luminance-chrominance color spaces (also known as "color models"), including those using linear luminance or non-linear luminance (Y'), such as YCbCr, Y'CbCr, YPbPr, Y'PbPr, Y'IQ, YDbDr, and the like.

FIG. 1 illustrates a video system 100 employing chroma subsampling to provide YUV 4:4:4 support using native sub-4:4:4 encoding/decoding in accordance with some implementations. In the illustrated example, the video system 100 includes a source device 102 connected to a sink device 104 via a transmission medium 106, which may represent, for example, a wired cable, a wireless connection, a complex network (e.g., a wireless local area network (WLAN) and/or the Internet), and the like. An example of a hardware implementation of one or both of the source device 102 or the sink device 104 is described in detail below with reference to FIG. 11.

The source device 102 operates to receive a stream of video images (e.g., input image 108) from, for example, a camera (captured imagery) or as a result of an video rendering process at the source device 102 or another device upstream, encode each video image to generate an encoded representation of the video image, and transmit the encoded representation to the sink device 104. The sink device 104 in turn operates to receive the encoded representation of each video image via the transmission medium 106 and then decode the encoded representation to obtain a corresponding output video image (e.g., output image 110), which represents the content of the corresponding input video image. The output video image then may be provided for display, stored for subsequent access, further processed (e.g., encoded at a different resolution), and the like.

To perform the encoding process, the source device 102 includes a color space conversion circuit 112 to convert the input image 108 from an RGB color space to a YUV color space (in the event that the input image 108 is not already in a YUV color space compatible with the encoding process) and an encoder circuit 114 to encode the image using any of a variety or combination of encoding schemes, such as H.264, H.265, AV1, Motion JPEG, and the like. Likewise, to perform the decoding process, the sink device 104 includes a decoder circuit 116 to decode the encoded data representative of the input image 108 to generate a YUV image and, if conversion to an RGB color space is needed, a color space conversion circuit 118 to convert the YUV image to an RGB color space, resulting in the output image 110. However, in implementations, one or both of the encoder circuit 114 or the decoder circuit 116 is unable to natively support full chroma resolution processing (that is, YUV 4:4:4). For example, the encoder circuit 114 may be fully implemented in hardcoded logic that is not configured to support YUV 4:4:4 and thus utilizes a hardware-based or software-based native chroma subsampling process 120 that automatically chroma subsamples any input YUV image to sub-4:4:4 resolution (e.g., to 4:2:2 or 4:2:0 resolution). As another example, the decoder circuit 116 may be limited by its hardware or software configuration to only be able to process image data that has been encoded at a sub-4:4:4 resolution. Thus, unmodified operation of the video system 100 would result in the transmission of encoded image data that has been chroma subsampled (at YUV 4:2:2 or 4:2:0) and, by extension, decoding of image data that has no more than 4:2:2 or 4:2:0 resolution.

To avoid mandatory chrominance resolution loss and to provide full YUV 4:4:4 encoding support in the video system 100, in implementations the source device 102 and sink device 104 employ a subframe-based chroma subsampling scheme that, in effect, distributes the full chrominance resolution (that is, the full UV plane) of the input image 108 over multiple subframes, each of which is treated as a separate image by the encoder circuit 114 and the decoder circuit 116. At the source device 102, a chroma preprocessing circuit 122 operates as an interface between the color space conversion circuit 112 and the encoder circuit 114, while at the sink device 104, a chroma postprocessing circuit 124 operates as an interface between the decoder circuit 116 and the color space conversion circuit 118. As explained in more detail below with reference to FIGS. 2-11, the chroma preprocessing circuit 122 and postprocessing circuit 124 together implement the subframe-based chroma subsampling scheme so as to generate a plurality of subframes such that even after the chroma subsampling process 120 is applied to each subframe by the encoder circuit 114, the resulting plurality of encoded subframes (as respective bit-streams) together, or collectively, contain the full chroma resolution of the input image 108 (or in some implementations, a higher chroma resolution than otherwise is natively supported by the encoder circuit 114 or decoder circuit 116), and from which a decoded representation of the input image 108 is composited to obtain the output image 110. As such, the circuits 122 and 124 together can operate to provide YUV 4:4:4 support in the video system 100 that has at least one of the encoder circuit 114 or the decoder circuit 116 with native sub-4:4:4 support only.

Figure 2:
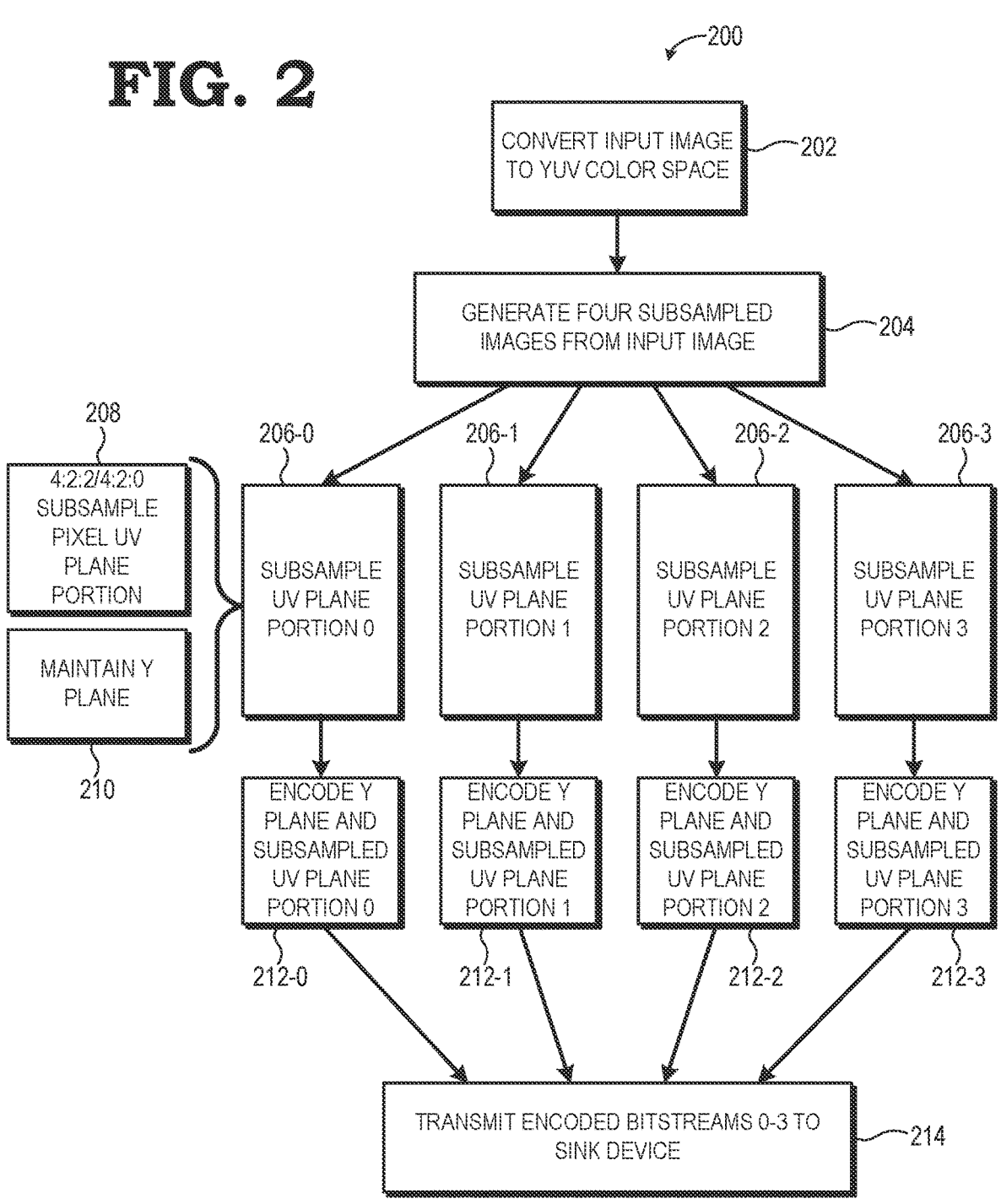
FIG. 2 is a flow diagram illustrating a method of an encoding operation by the video system of FIG. 1 in accordance with some implementations.

FIG. 2 illustrates a method 200 depicting an example encoding operation of the source device 102 in more detail in accordance with implementations. To facilitate understanding, the method 200 is described with reference to an example of an encoding process depicted by FIG. 3. The method 200 is initiated by generation or receipt of an RGB image (input image 108) at the source device 102. For example, the source device 102 may be connected to a video camera or other imaging system that is capturing live video as a sequence of RGB images. As another example, the source device 102 may include or be connected to a rendering system that is rendering video as a sequence of computer-generated images (e.g., as a remote video game server). As yet another example, the source device 102 may be accessing pre-recorded or pre-rendered video content from local or remote storage (e.g., as a video streaming server).

Figure 3:
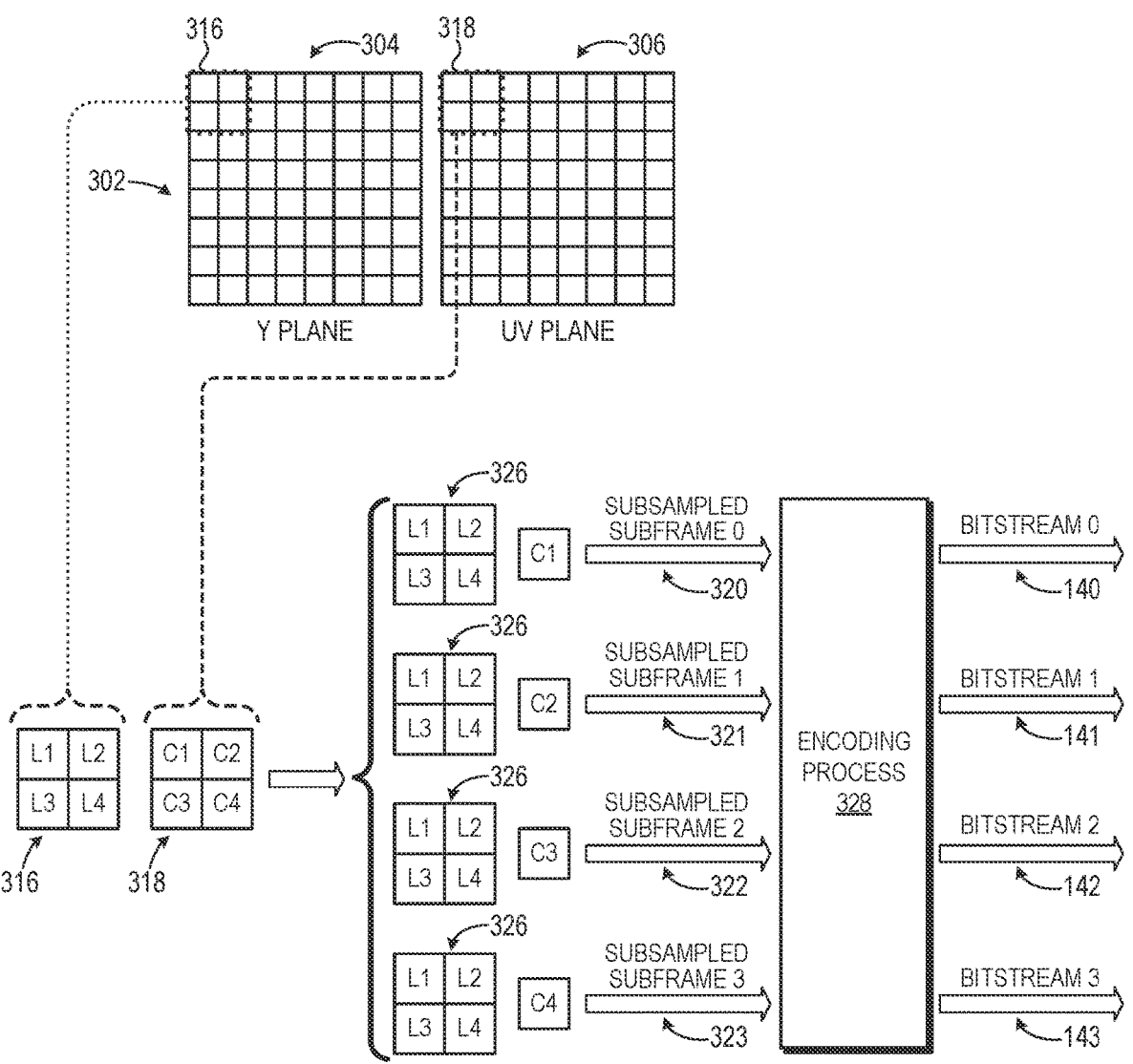
FIG. 3 is a diagram illustrating an example of the method of FIG. 2 in accordance with some implementations.

In response to receipt or access of the input image 108, and if the input image 108 is not already in a compatible YUV color space, then at block 202 the color space conversion circuit 112 operates to perform color space conversion by converting the RGB color space of the input image 108 to a YUV color space using any of a variety of well-known or proprietary color space conversion schemes, resulting in a full chroma resolution YUV image 302 (FIG. 3). Otherwise, if already received in a compatible YUV color space, the process of block 202 is bypassed and the input image 108 and the YUV image 302 are the same image. The YUV image 302 comprises pixel data composed of a Y plane 304 (FIG. 3) comprising the luminance values for the pixels of the input image 108 and a UV plane 306 (FIG. 3) comprising the U chrominance and V chrominance values representing the pixels of the input image 108. It will be appreciated that the UV plane 306 itself can be represented as a U plane and a V plane, but is illustrated and referenced in aggregate as the UV plane 306 for ease of reference and consistent with industry norms. In implementation, the input image 108 typically would have many thousands or millions of pixels and thus the resulting Y plane and UV plane would have many thousands or millions of values, but for ease of illustration the example Y plane 304 and UV plane 306 of FIG. 3 are depicted and described using a simple example of 8×8 arrays for each, representing an 8×8 pixel array for the input image 108.

At block 204, the chroma preprocessing circuit 122 operates to generate up to four subframes 130-133 (also denoted as subframes 0-3) (FIG. 1) from the YUV image 302, each subframe having the same entire Y plane 304 and a distinct portion of the UV plane 306, which is referred to herein as a "UV plane portion". In some implementations, the distinct UV plane portions included in subframes 130-133 are generated via selective chroma sampling of the UV plane 306 that is offset in position for each subframe relative to the sampling performed for the other subframes. For example, as illustrated in FIG. 3, the chroma preprocessing circuit 122 determines a UV plane portion for inclusion in the subframe 130 by using zero pixel offset in the starting position for the corresponding sampling. The chroma preprocessing circuit 122 determines a UV plane portion for inclusion in the subframe 131 by applying a downward pixel offset in the starting position for the corresponding sampling, such that the UV plane portion includes all of the values of the UV plane 306 except the top row. The chroma preprocessing circuit 122 determines a UV plane portion for inclusion in the subframe 132 by applying a leftward pixel offset in the starting position for the corresponding sampling. The chroma preprocessing circuit 122 determines a UV plane portion for inclusion in the subframe 133 by applying a downward-and-leftward pixel offset in the starting position for the corresponding sampling. Other orders of offset sampling instead may be employed, as well as other directions of offset sampling (e.g., offsetting the starting position for sampling up instead of down and/or offsetting right instead of left).

At blocks 206-0 to 206-3, the resulting subframes 130-133, respectively, are supplied to the encoder circuit 114, which treats the copy of the Y plane 304 and distinct UV plane portion in each subframe as a separate image for encoding. To illustrate with reference to block 206-0, the corresponding copy of the Y plane 304 and the UV plane portion are input to the encoder circuit 114, which at sub-block 208 employs the sub-4:4:4 chroma subsampling process to chroma subsample the UV plane portion (e.g., at a 4:2:2 subsampling) to generate a corresponding subsampled UV plane portion, while at sub-block 210 the corresponding copy of the Y plane 304 is maintained without subsampling. This process is repeated for each of the remaining subframes 131-1 to 131-3 at the corresponding blocks 206-1 to 206-3, either in parallel or in sequence, depending on the configuration and resources of the encoder circuit 114.

In implementations, the chroma subsampling process 120 operates to subsample each input UV plane portion using the same subsampling process or algorithm. For example, if employing a 4:2:0 subsampling, the chroma subsampling process 120 may obtain a 50% reduction in both horizontal and vertical resolution by discarding the UV value at every other row and every other column, such that the first UV value at the first row and first column in the UV plane portion (that is, the first U value from the U plane and the first V value from the V plane) is maintained, but the second UV value at the first row and second column is discarded, and so forth. That is, the subsampling performed by the chroma subsampling process 120 employs the same maintain/discard pattern for each input UV plane portion, starting at the same start/reference point of the first UV value at the first row and first column. Thus, by performing the four different chrominance subsampling on the original UV plane 306 to generate the four distinct UV plane portions, the maintain/discard subsampling pattern is applied at a different starting point relative to the original UV plane 306 such that the full chroma content of the original UV plane 306 subsequently is present in aggregate across all four subsampled UV plane portions.

To illustrate, refer to a 2×2 array 316 of luminance values (denoted L1, L2, L3, and L4) from the Y plane 304 and a corresponding 2×2 array 318 of chrominance values (denoted C1, C2, C3, and C4) from the original UV plane 306. As a full copy of the original Y plane 304 is maintained by the chroma subsampling process 120 for the subframes 130-133, each of the resulting subsampled subframes 320-

323 (also referred to herein as subsampled subframes 0-3, respectively) includes a full copy 326 of the 2×2 array 316 of luminance values (or every second or fourth subsampled subframe, so as to reduce the amount of time needed to encode and decode the full image consisting of a number of chroma-subsampled subframes. However, in this example, a 4:2:0 subsampling process is employed, and thus for every separate 2×2 array of UV values in an input UV plane portion, only the top-left-most UV value is maintained, and the other three UV values are discarded (assuming, in this example, the first row and first column are maintained in the maintain/discard subsampling pattern). Thus, through the offset sampling process, the UV values in each 2×2 array are different for each of the four UV plane portions generated from the offsetting of the starting point for sampling of the UV plane 306. Thus, with reference to the 2×2 array 318, for subframe 0, the chroma value C1 is maintained while chroma values C2, C3, and C4 are discarded. For subsampled subframe 1, the chroma value C2 is maintained while chroma values C1, C3, and C4 are discarded. For subsampled subframe 2, the chroma value C3 is maintained while chroma values C1, C2, and C4 are discarded. For subsampled subframe 3, the chroma value C4 is maintained while chroma values C1, C2, and C3 are discarded. As a result, while the resulting subsampled UV plane portion for each subsampled subframe 0-3 does not individually have the original resolution of UV plane 306 (and thus is capable of being encoded by the encoder circuit 114 with only native sub-4:4:4 support), the subsampled subframes 0-3 collectively contain all of the original chroma information of the UV plane 306 even after the lossy chroma subsampling process 120 is applied to each subframe. For example, with reference to the 2×2 array 318 from the UV plane 306, the subsampled subframes 320-323 together contain the chroma values C1, C2, C3, and C4, and thus from subsampled subframes 320-323 the complete 2×2 array 318 can be recreated even though each individual subsampled subframe contains only one chroma value for the 2×2 array 318. This same result occurs for each 2×2 array in each of the Y plane 304 and the UV plane 306.

Referring back to FIG. 2, following application of the chroma subsampling process 120 to each of the subframes 130-133 to generate the subsampled subframes 320-323, the subsampled subframes 320-323 are encoded by an encoding process 328 (FIG. 3) at the encoder circuit 114, as represented by blocks 212-0 to 212-3, respectively, to generate corresponding bitstreams 140-143 (FIG. 1), respectively, with each bitstream representing an encoded representation of a corresponding subsampled subframe. Thus, for a given input subsampled subframe, the encoding process 328 includes encoding the full copy of the Y plane 304 and encoding the subsampled UV plane portion of the subsampled subframe to generate a bitstream. Any of a variety of encoding schemes may be employed, such as H.264, H.265, AOMedia Video 1 (AV1), and the like. At block 214, the resulting plurality of bitstreams 140-143 are transmitted to the sink device 104 via the transmission medium 106.

In some implementations, such as for H.264, H.265, or AV1-based codecs, each of the subframes 0-4 is encoded as a separate encoder session (substream) and decoded as a separate decoder session (substream) so as to avoid flicker or other artifacts. The multiple sessions may be implemented using multiple instances of codec hardware in parallel, or time-multiplexing the same codec hardware between multiple sessions. In other implementations, such as for Motion JPEG-based codecs, which encode each image of the video stream independently of other images and do not cross-reference images, all of the subframes may be encoded in the same video stream and the encoder circuit 114 could provide a descriptor or other metadata that identifies which chroma data is associated with which image. Moreover, while the description above describes a process in which the luminance information is included in each subframe for purposes of compatibility with common types of codecs, in an alternative implementation, the encoder circuit 114 can be configured to incorporate the luminance information in only every Xth subframe (X=2 or 4) and the decoder circuit 116 being configured to expect and extract the luminance information from only every Xth subframe so as to reduce the amount of encoded duplicate luminance information transmitted between the source device 102 and the sink device 104.

Figure 4:
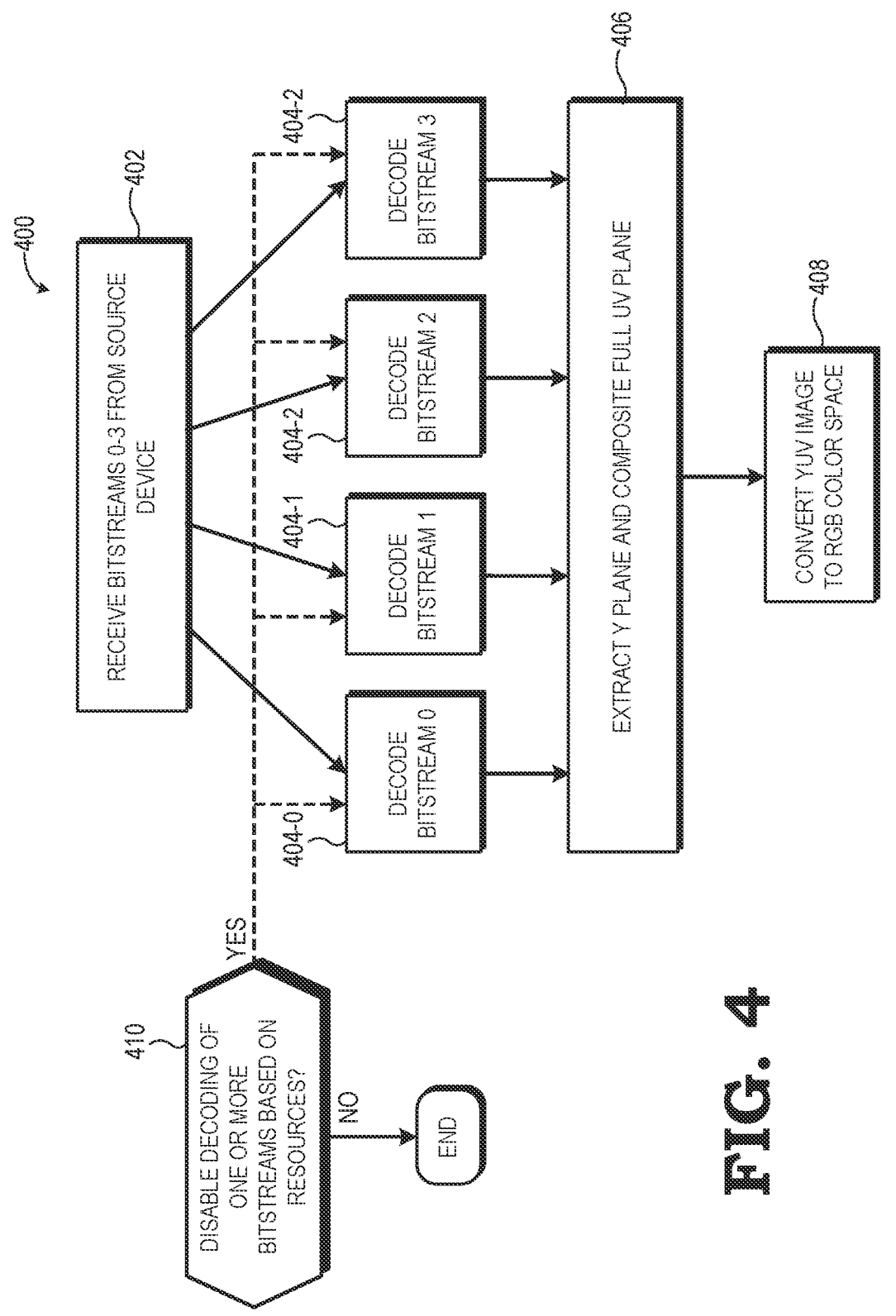
FIG. 4 is a flow diagram illustrating a method of a decoding operation by the video system of FIG. 1 in accordance with some implementations.

FIG. 4 illustrates a method 400 depicting an example decoding operation of the sink device 104 in more detail in accordance with implementations. To facilitate understanding, the method 400 is described with reference to an example of a decoding process depicted by FIG. 5 and which represents the decoding of the encoded subsampled subframes 0-3 illustrated in the example of FIG. 3. The method 400 is initiated at block 402 with the receipt of the bitstreams 0-3 (bitstreams 140-141) from the source device 102. At blocks 404-0 to 404-3, the decoder circuit 116 decodes each of the bitstreams 0-3 to generate corresponding decoded subframes 0-3 (decoded subframes 150-153, FIG. 1). The decoded subframes 0-3 represent either exact copies or inexact copies of the subsampled subframes 0-3 (subsampled subframes 320-323, FIG. 3) depending on whether the encoding/decoding processes employed by the encoder circuit 114 and decoder circuit 116 are lossless or lossy.

Following decoding, the decoded subframes 0-3 individually have sub-4:4:4 resolution (and thus are able to be decoded by an implementation of the decoder circuit 116 that does not have native support for YUV 4:4:4 encoding). However, the decoded subframes 0-3 collectively contain all of the original chroma information of the UV plane 306. Accordingly, at block 406 the chroma postprocessing circuit 124 operates to generate a representation of the original input image 108 in the YUV color space by compositing the full UV plane 306 from the subsampled UV plane portions extracted from the plurality of decoded subframes 0-3. Moreover, the entire Y plane may be extracted from one or more of the decoded subframes 0-3. For example, in some implementations, the Y plane 304 is extracted from a single one of the decoded subframes 0-3, while in other implementations the resulting Y plane 304 is generated as an aggregate of the Y planes of two or more of the subframes 0-3, for example, as the average of Y values of the corresponding pixels from all four subframes 0-3.

Figure 5:
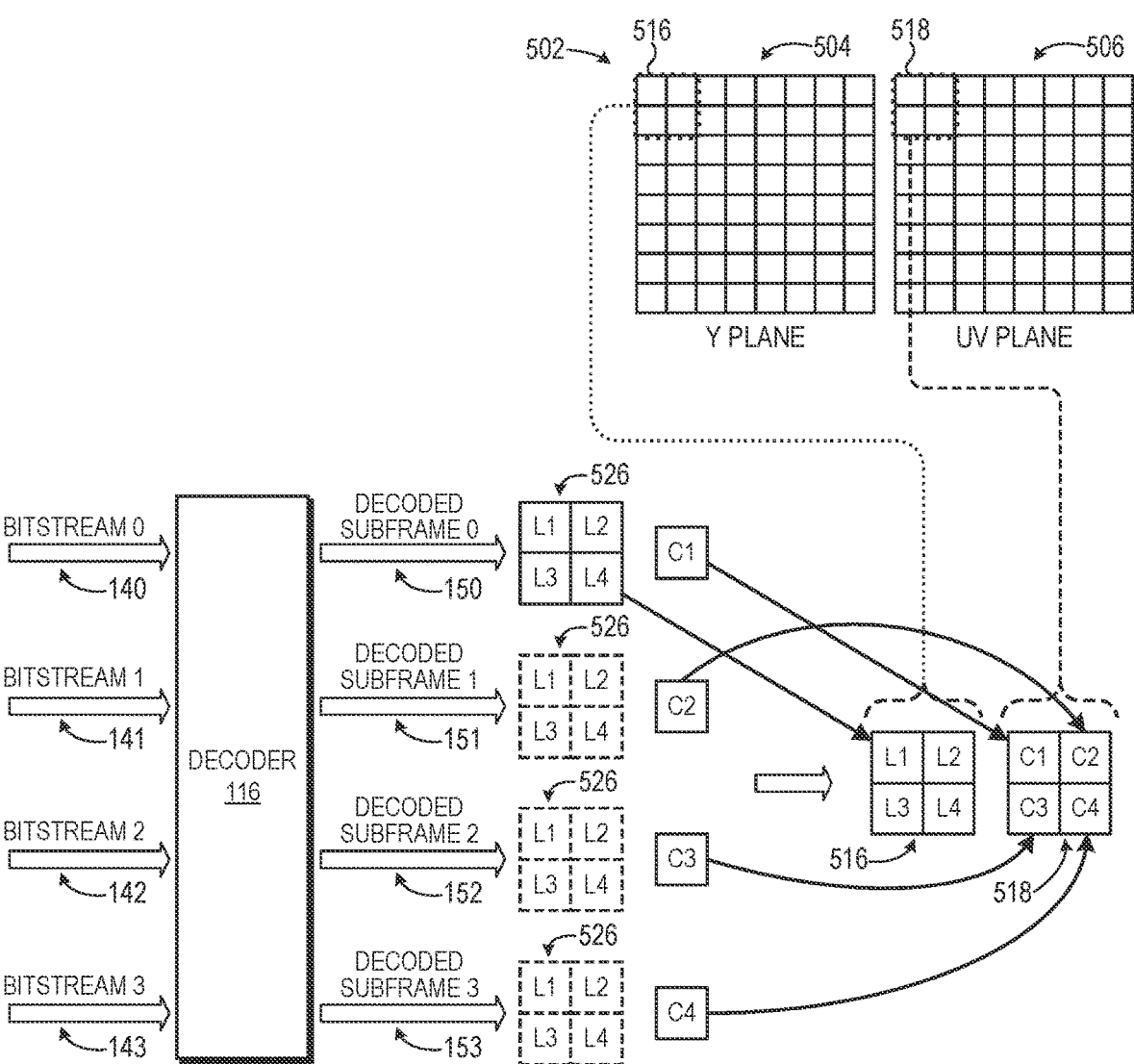
FIG. 5 is a diagram illustrating an example of the method of FIG. 4 in accordance with some implementations.

To illustrate, FIG. 5 depicts the output of the decoder circuit 116 for each input bitstream 140-143/decoded subframe 150-153 relative to a corresponding 2×2 array 516 of a Y plane 504 (representing the original Y plane 304) and a corresponding 2×2 array 518 of a UV plane 506 (representing the original UV plane 306) of a reconstructed YUV image 502 (representing the YUV image 302). In this example, the chroma postprocessing circuit 124 extracts a corresponding 2×2 array 526 of luminance values (denoted L1-L4) from the copy of the Y plane 304 obtained from, for example, the decoded subframe 150 (and which corresponds to the 2×2 array 326 of FIG. 3) and inserts the 2×2 array 526 of luminance values in the corresponding 2×2 array 516 of the Y plane 504 being reconstructed. Further, the chrominance value C1 is extracted from the decoded subframe 0 and used to populate the first row/first column position of the array 518 of the UV plane 506 being reconstructed, the chrominance value C2 is extracted from the decoded subframe 1 and used to populate the first row/second column position of the array 518, the chrominance value C3 is extracted from the decoded subframe 2 and used to populate the second row/first column position of the array 518, and the chrominance value C4 is extracted from the decoded subframe 3 and used to populate the second row/second column position of the array 518. In this way, the chroma postprocessing circuit 124 is able to composite the full chroma resolution of the array 518 of the reconstructed UV plane 506 from the subsampled chroma information of each of the four decoded subframes. This same process is applied for each pixel position of the Y plane 504 and the UV plane 506, resulting in a reconstructed YUV image 502 having the Y plane 504 and the UV plane 506 and with the full chroma resolution of the original YUV image 302. In the event that subsequent processes require an RGB color space, then at block 408, the color space conversion circuit 118 can perform a color space conversion process to convert the YUV image 502 from the YUV color space to an RGB color space, and thereby generating the output image 110. Otherwise, the YUV image 502 is output as the output image 110. In some implementations, color space conversion to RGB may be combined with composition of the full chroma resolution image, resulting in blocks 406 and 408 being implemented as a single process.

Thus, with the above-described approach of spreading (the chroma information across multiple subframes such the multiple subframes in aggregate contain the complete chroma resolution following the chroma subsampling process, the video system 100 can provide, in effect, 4:4:4 encoding even when one or both of the encoder circuit 114 or the decoder circuit 116 is natively limited to only sub-4:4:4 encoding of any given input stream (that is, configured to apply chroma subsampling to any input stream/subframe as part of the encoding process or is configured to operate only with subsampled chroma information as part of the decoding process). Moreover, because the full Y plane (e.g., Y plane 304) is represented in each of the subframes, each subframe can be processed by the encoder circuit 114 and the decoder circuit 116 as a separate image.

Moreover, method 400 further can include a performance scaling subprocess where, at block 410, the decoder circuit 116 or another component of the sink device 104 evaluates the workload requirements for decoding the four bitstreams 140-143 relative to the current decoding resources available at the sink device 104. For example, the decoder circuit 116 may be a software-based decoder that executes on a processor, and the decoder circuit 116 evaluates whether the processor has sufficient available bandwidth or other resources to satisfactorily decode all four bitstreams. In the event that sufficient decoding resources are currently available, then the decoder circuit 116 or other component of the sink device 104 configures the decoder circuit 116 to decode all four bitstreams. In the event that there are not enough available decoding resources to sufficiently decode all four bitstreams, then the decoder circuit 116 is configured to bypass decoding of one or more of the bitstreams 140-143. In this event, the process of block 406 remains the same with respect to recovery of the original Y plane 304 as reconstructed Y plane 504 since each encoded substream includes its own separate and full copy of the Y plane 304. However, bypassing decoding of a bitstream means that the chroma information contained in the bypassed bitstream is unavailable for reconstruction of the UV plane. Accordingly, the compositing process of block 406 is then modified such that any missing chroma value resulting from bypassed encoding of a bitstream may be recovered via, for example, replication of an adjacent chroma value or by blending, averaging, or otherwise interpolating the missing chroma value from two or more adjacent chroma values.

Figure 6:
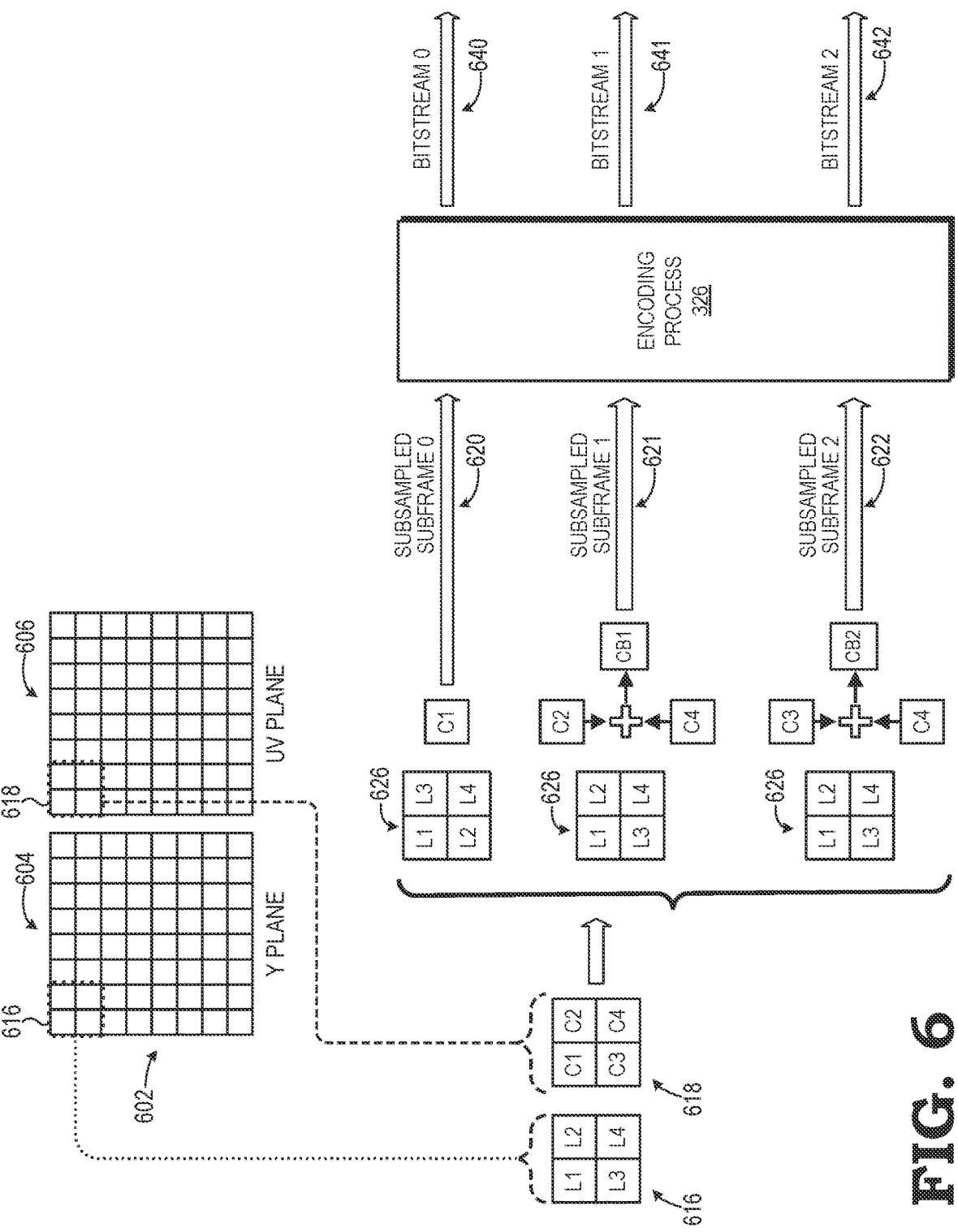
FIG. 6 is a diagram illustrating an example of a variation of the encoding method of FIG. 2 using blended chrominance sampling in accordance with some implementations.
Figure 7:
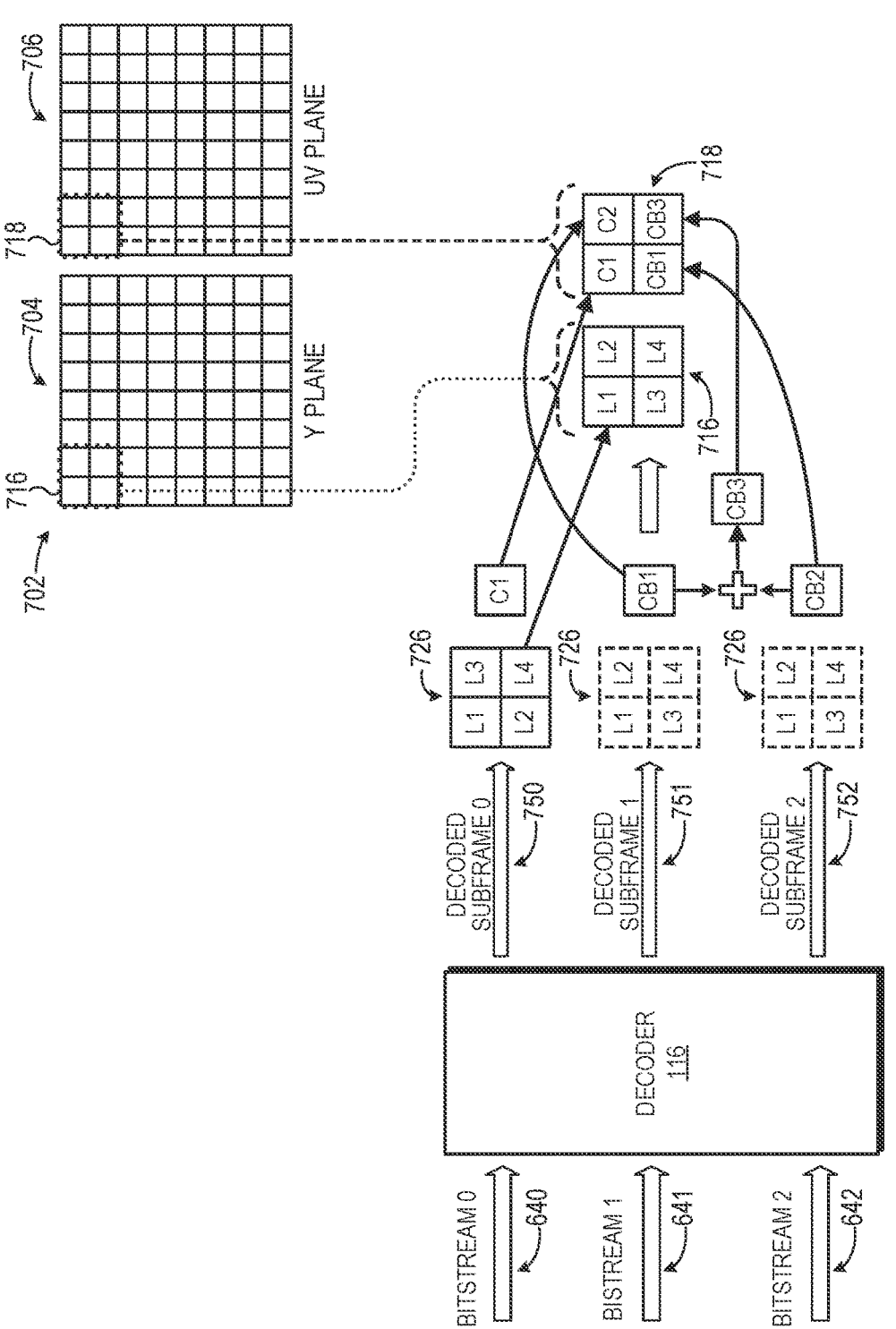
FIG. 7 is a diagram illustrating an example of a variation of the decoding method of FIG. 3 using the blended chrominance sampling of FIG. 6 in accordance with some implementations.

FIGS. 6 and 7 together illustrate an implementation of the chroma subsampling scheme when three subframes are employed. FIG. 6 depicts the encoding process in a similar manner as the example of FIG. 3. As shown, the chroma preprocessing circuit 122 includes a full copy of the Y plane 304 in each of three resulting subframes 0-2, for example, all four luminance values L1-L4 of any given 2×2 array 616 of the Y plane 304 are included in each of the generated subframe 0-2. This may be implemented by, for example, dropping one chroma value in any given 2×2 array 618 of the UV plane 306 and then blending the dropped chroma value with one of the other three chroma values to generate a first blended chroma value and blending the dropped chroma value with another of the three chroma values to generate a second blended chroma value, and thus resulting in one original chroma value and two blended chroma values for each 2×2 array 618. More generally, one of the three subframes is allocated a first subset of the chrominance plane (e.g., every UV value located at the top, leftmost position of every 2×2 array within the UV plane 306, the second subframe is allocated a first set of blended chrominance values in which each blended chrominance value is generated from the blending of a chrominance value of a second subset of the UV plane with a corresponding chrominance value of a third subset of the UV plane, and the third subframe is allocated a second set of blended chrominance values in which each blended chrominance value is generated from the blending of a chrominance value of a fourth subset of the UV plane with a corresponding chrominance value of the second subset of the UV plane.

The chroma preprocessing circuit 122 then distributes each of the resulting three chroma values for each 2×2 array 618—the original chroma value and the two blended chroma values—between the three subframes 0-2 to generate three subframes, each of which is subjected to the chroma subsampling process 120 at the encoder circuit 114. In the example of FIG. 6, with respect to the 2×2 array 618, the chroma value C4 is dropped, and this results in a subsampled subframe 620 that includes the chroma value C1, a subsampled subframe 621 that includes a blended chroma value CB1 that is an average or other blend of chroma values C2 and C4, and a subsampled subframe 622 that includes a blended chroma value CB2 that is an average or other blend of chroma values C3 and C4. As with the four subframe process described above, these three subsampled subframes 620-622 are subjected to the encoding process 328 by the encoder circuit 114 to generate bitstreams 640-642, which are transmitted to the sink device 104.

FIG. 7 depicts the decoding process of the bitstreams 640-642 in a similar manner as the decoding example of FIG. 5. The three bitstreams 640-642 are received at the sink device 104, whereupon they are decoded by the decoder circuit 116 to generate three corresponding decoded subframes 750-752. The chroma postprocessing circuit 124 then extracts the full copy of the Y plane 704 from one of the decoded subframes for use as a Y plane 704 of a recovered YUV image 702, and then composites a UV plane 706 of the recovered YUV image 702 from the UV data included in all three decoded subframes 750-752. For example, for a given 2×2 array 716 of the Y plane 704, the chroma postprocessing circuit 124 extracts a corresponding 2×2 array 728 from the copy of the Y plane 304 included in the decoded subframe

750. For a given 2×2 array 718 of the UV plane 706, the chroma postprocessing circuit 124 extracts the chroma value C1 from the decoded subframe 750 for insertion at the first row/first column of the array 718, extracts the chroma value CB1 from the decoded subframe 751 for insertion at the first row/second column of the array 718, and extracts the chroma value CB2 from the decoded subframe 752 for insertion at the second row/first column of the array 718. For the second row/second column of the array 718 corresponding to the position of the dropped chroma value C4, the chroma postprocessing circuit 124 can, for example, average or otherwise blend the blended chroma value CB1 with the blended chroma value CB2 to generate a third blended chroma value CB3, which is inserted at the second row/second column of the array 718. This same process is repeated for the remaining 2×2 arrays of the UV plane 706. Under this approach, a resolution of better than YUV 4:2:2 can be obtained for the output image even when limited to an encoder circuit or decoder circuit that provides only native support for YUV 4:2:2.

Figure 8:
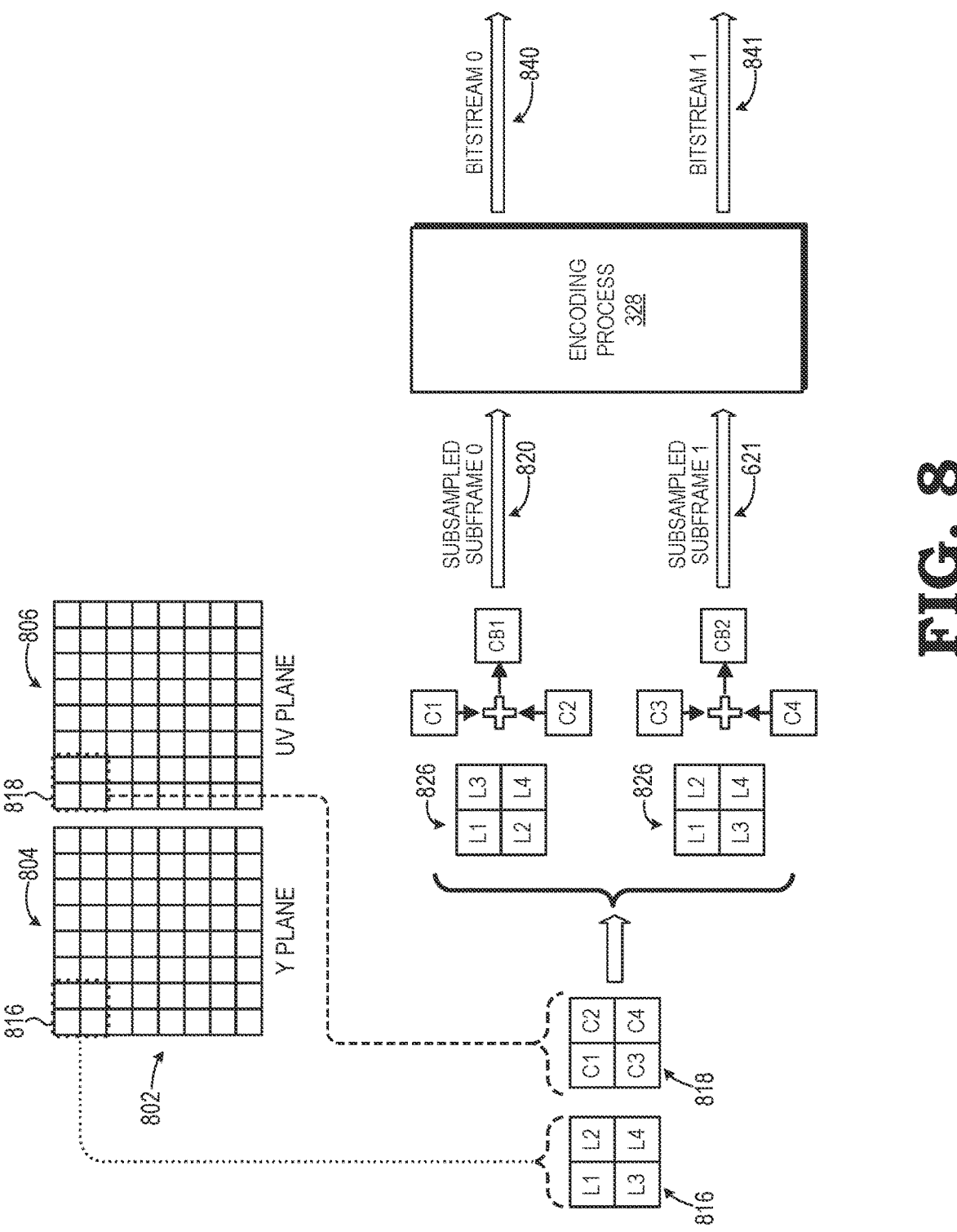
FIG. 8 is a diagram illustrating an example of another variation of the encoding method of FIG. 2 using blended chrominance sampling in accordance with some implementations.
Figure 9:
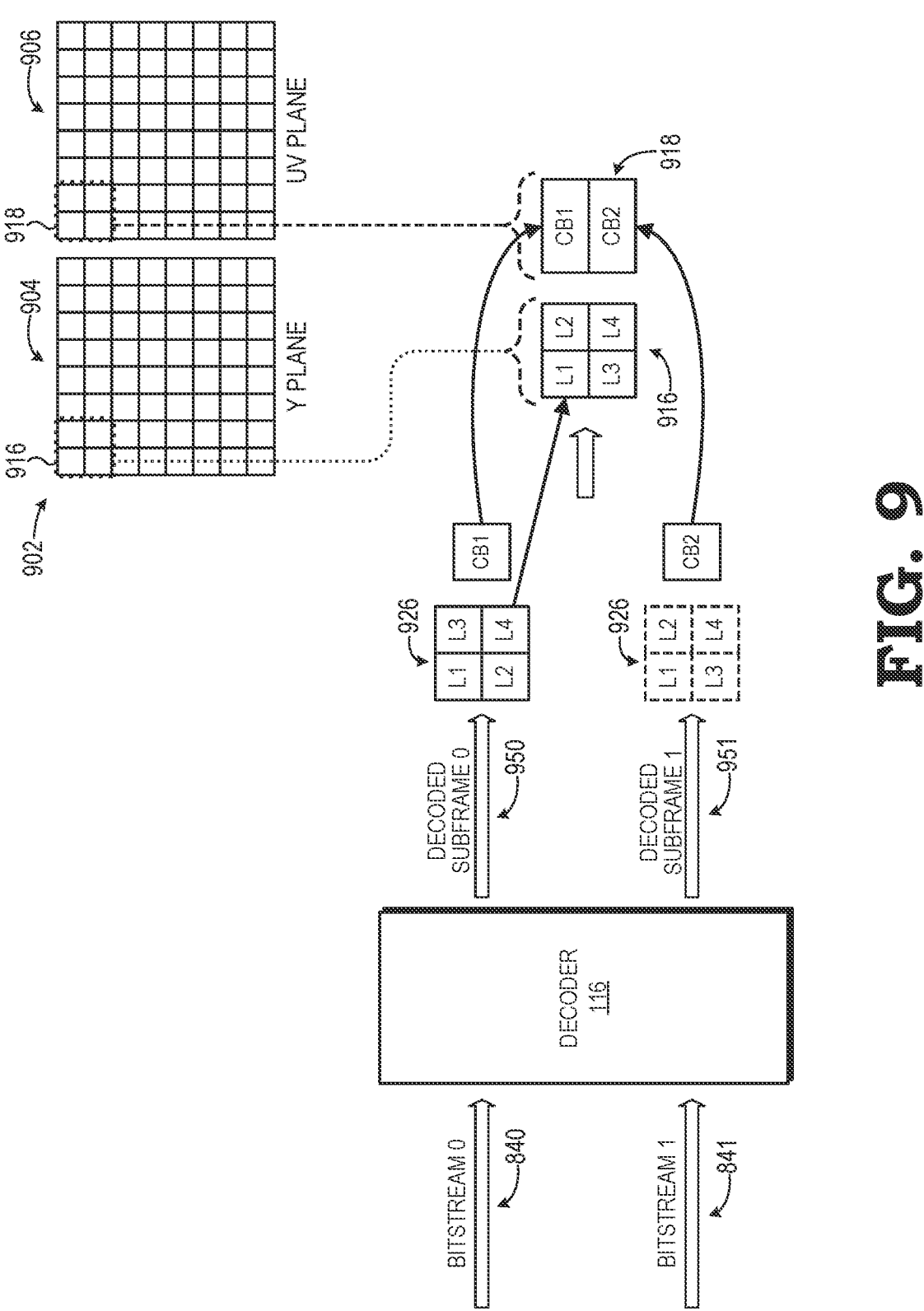
FIG. 9 is a diagram illustrating an example of another variation of the decoding method of FIG. 3 using the blended chrominance sampling of FIG. 8 in accordance with some implementations.

FIGS. 8 and 9 together illustrate another implementation of the chroma subsampling scheme when two subframes are employed. FIG. 8 depicts the encoding process in a similar manner as the example of FIGS. 3 and 5. As shown, the chroma preprocessing circuit 122 includes a full copy of the Y plane 304 in each of two resulting subsampled subframes 0 and 1 (subsampled subframes 820 and 821), for example, all four luminance values L1-L4 of any given 2×2 array 816 of the Y plane 304 are included as copies 726 in both of the two generated subframes 0 and 1. However, as there are only two subsampled subframes per image, only two UV values may be provided for any given 2×2 array 818 of the UV plane 306. In the illustrated example, this is implemented by, for example, blending each pair of chroma values in any given 2×2 array 818 of the UV plane 306 to generate two corresponding blended chroma values, each of which may be included in one of the corresponding subsample subframes. To illustrate, in the example of FIG. 8, the chroma values C1 and C2 of array 818 may be averaged or otherwise blended to generate a blended chroma value CB1 for inclusion in the subsampled subframe 0 and the chroma values C3 and C4 of array 818 may be averaged or otherwise blended to generate a blended chroma value CB2 for inclusion in the subsampled subframe 1. The two subsampled subframes 820 and 821 are then subjected to the encoding process 328 by the encoder circuit 1114 to generate bitstreams 840 and 841, which are transmitted to the sink device 104.

FIG. 9 depicts the decoding process of the bitstreams 840 and 841 in a similar manner as the decoding example of FIG. 7. The two bitstreams 840 and 841 are received at the sink device 104, whereupon they are decoded by the decoder circuit 116 to generate two corresponding decoded subframes 950 and 951. The chroma postprocessing circuit 124 then extracts the full copy of the Y plane 304 from one of the decoded subframes for use as a Y plane 904 of a recovered YUV image 902, and then composites a UV plane 906 of the recovered YUV image 902 from the UV data included in both decoded subframes 950 and 951. For example, for a given 2×2 array 916 of the Y plane 904, the chroma postprocessing circuit 124 extracts a corresponding 2×2 array 926 from the copy of the Y plane 304 included in the decoded subframe 950. For a given 2×2 array 918 of the UV plane 906, the chroma postprocessing circuit 124 extracts the chroma value CB1 from the decoded subframe 950 for insertion at both the first row/first column and first row/second column of the array 918, extracts the chroma value CB2 from the decoded subframe 951 for insertion at both the second row/first column and second row/second column of the array 718. In this way, the resulting YUV image 902 has greater chroma resolution than otherwise would be afforded by a conventional YUV 4:2:0 encoding, without requiring that both the encoder circuit 114 and decoder circuit 116 natively support higher than YUV 4:2:0 encoding.

Figure 10:
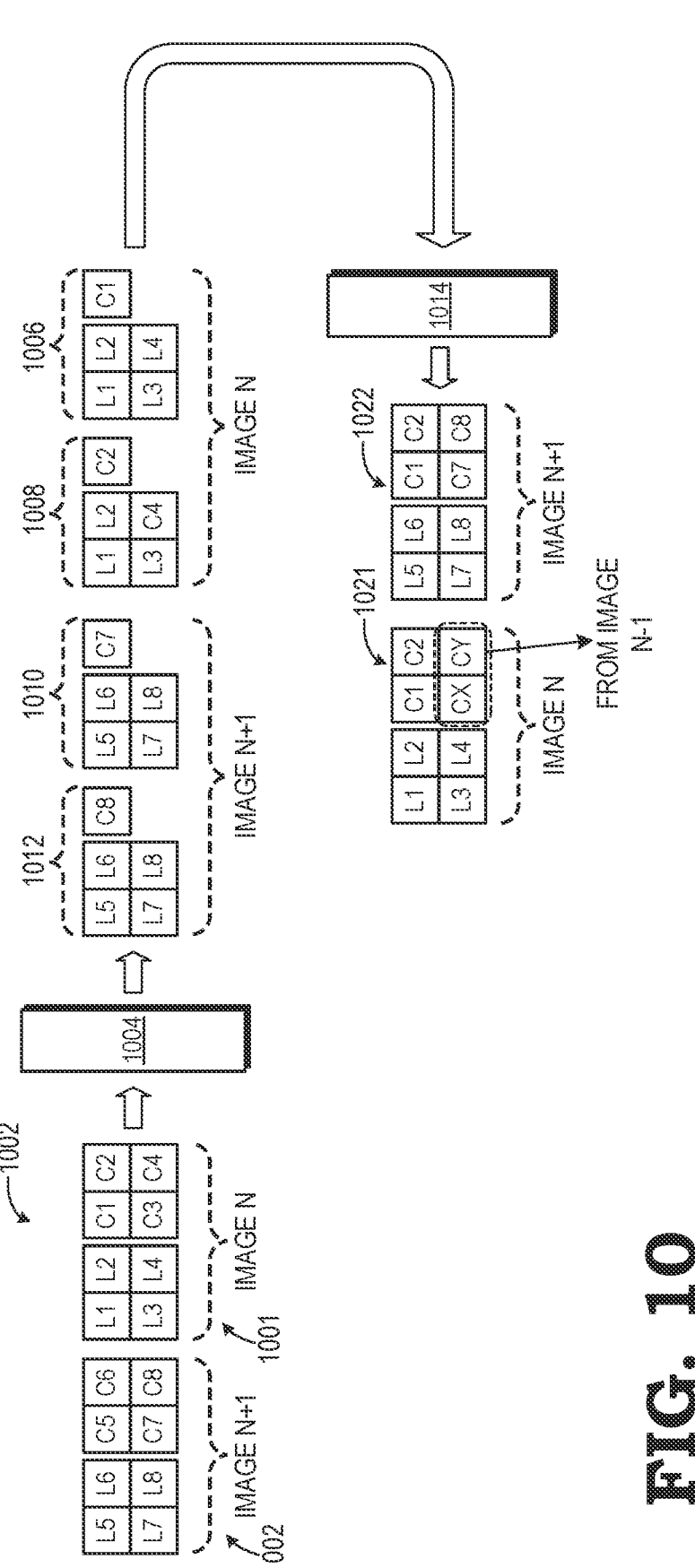
FIG. 10 is a diagram illustrating an example of another variation of the encoding and encoding and decoding methods of FIGS. 2 and 3 using temporal chrominance subsampling in accordance with some implementations.

FIG. 10 illustrates another implementation of the chroma subsampling scheme in which chroma information from a previous image may be recovered for use in compositing the chroma information for the present image, referred to herein as a temporal subsampling mode. In this approach, rather than distributing the entire chroma resolution across four subframes for each input image, the chroma preprocessing circuit 122 and the chroma subsampling process 120 instead distribute half of the chroma information for an image across two subsampled subframes. The encoder circuit 114 then encodes the resulting subsampled subframes to generate two bitstreams, which are then transmitted to the sink device 104. At the sink device 104, the decoder circuit 116 decodes the two bitstreams to generate two decoded subframes. The chroma postprocessing circuit 124 then composites half of the chroma information for a resulting output image from the chroma information contained in the two decoded subframes, and buffers this chroma information as well. For the remaining half of the chroma information for the output image, the chroma postprocessing circuit 124 utilizes the chroma information buffered for the preceding input image in the video stream. That is, to reconstruct a full chroma resolution for an image N+1, the chroma postprocessing circuit 124 uses the chroma information from the two decoded subframes for image N+1 as well as the chroma information from the two decoded subframes for the preceding image N.

To illustrate, assume a video stream includes a sequence of images N−1 (not shown), N (image 1001), and N+1 (image 1002). For image N, the chroma preprocessing circuit 122 and chroma subsampling process 120 operate (block 1004) to generate two subsampled subframes 1006 and 1008, each having the full luminance resolution of the image N (e.g., luminance values L1, L2, L3, and L4 for the illustrated 2×2 pixel block). The subsampled subframe 1006 has only one-fourth of the chrominance information of the image N (e.g., chrominance value C1 for the illustrated 2×2 pixel block) and the subsampled subframe 1008 has only a different one-fourth of the chrominance information of the image N (e.g., chrominance value C2 for the illustrated 2×2 pixel blocks). The other half of the chrominance information for image Nis excluded from the resulting subsampled subframes 1004 and 1106. The encoder circuit 114 encodes the subframes 1006 and 1008 and the resulting bitstreams are transmitted to the sink device 104. This same process was applied to image N−1, resulting in two subframes likewise being encoded and the resulting bitstreams being transmitted to the sink device 104.

For image N+1, the chroma preprocessing circuit 122 and chroma subsampling process 120 operate (block 1004) to generate two subsampled subframes 1010 and 1012, each having the full luminance resolution of the image N+1 (e.g., luminance values L5, L6, L7, and L8 for the illustrated 2×2 pixel block). The subsampled subframe 1010 has only one-fourth of the chrominance information of the image N+1 (e.g., chrominance value C7 for the illustrated 2×2 pixel block) and the subsampled subframe 1008 has only a different one-fourth of the chrominance information of the image N+1 (e.g., chrominance value C8 for the illustrated 2×2 pixel blocks). The other half of the chrominance information for image N+1 is excluded from the resulting subsampled subframes 1010 and 112. The encoder circuit 114 encodes the subframes 1010 and 1012 and the resulting bitstreams are transmitted to the sink device 104.

This same process was applied to image N−1, resulting in two bitstreams representing two subframes being transmitted to the sink device 104, with one subframe containing one-fourth of the chrominance information for image N−1 and the other subframe containing another one-fourth of the chrominance information for image N−1.

At the sink device 104, the encoded bitstreams are decoded to generate two corresponding decoded subframes. The chroma postprocessing circuit 124 operates (block 1014) to extract the luminance information to generate the luminance plane for a resulting output image 1021 (representing image N) and extracts the chrominance information from each of the decoded subframes to composite one-half of the chrominance plane for the output image 1021 (as illustrated by chrominance values C1 and C2 for the illustrated 2×2 pixel block). The chroma postprocessing circuit 124 also buffers the chrominance values C1 and C2 for use in reconstructing image N+1. For the missing half of the chrominance resolution for output image 1021, the chroma postprocessing circuit 124 utilizes the chrominance information buffered from the decoding of the two subframes received for image N−1 (as represented by chrominance values CX and CY for the illustrated 2×2 pixel block).

For recovering image N+1, the decoder circuit 114 decodes the corresponding bitstreams to generate two decoded subframes. The chroma postprocessing circuit 124 operates (block 1014) to extract the luminance information to generate the luminance plane for a resulting output image 1022 (representing image N+) and extracts the chrominance information from each of the decoded subframes to composite one-half of the chrominance plane for the output image 1021 (as illustrated by chrominance values C7 and C8 for the illustrated 2×2 pixel block). The chroma postprocessing circuit 124 also buffers the chrominance values C7 and C8 for use in reconstructing image N+2 (not shown). For the missing half of the chrominance resolution for output image 1022, the chroma postprocessing circuit 124 utilizes the chrominance information buffered from the decoding of the two subframes received for image N (as represented by chrominance values C1 and C2 for the illustrated 2×2 pixel block).

Thus, as illustrated, the chrominance information used to composite a chroma plane for a reconstructed image be temporally spread over the transmitted encoded subframes for two images. To ensure that the chrominance information for each subframe is correctly spatially sampled in order to allow reconstruction, the sampling position for each successive subframe may be selected on a N modulo 4 approach. For example, for a 2×2 block, the chrominance information at the top-left pixel for image Nis selected for the first subframe for image N, the chrominance information at the top-right pixel for image N is selected for the second subframe for image N, the chrominance information at the bottom left pixel for image N+1 is selected for the first subframe for image N+1, the chrominance information at the bottom right pixel for image N+1 is selected for the second subframe for image N+1, the chrominance information at the top-left pixel for image N+2 is selected for the first subframe for image N+2, the chrominance information at the top-right pixel for image N+2 is selected for the second subframe for image N+2, and so forth.

Although FIG. 10 illustrates a particular implementation in which the chroma information is distributed over two subframes, a similar approach can be employed to distribute the chroma information over four subframes instead, such as when further reduction in codec and transmission channel bandwidth is appropriate. In this case only one subframe, containing chrominance value C1 would be sent for image N, one subframe containing chrominance value C2 would be sent for image N+1, one subframe containing chrominance value C3 would be sent for image N+2 and one subframe containing chrominance value C4 would be sent for image N+3. This would result in no increase of the required codec (encoder and decoder) bandwidth compared to regular YUV4:2:0 encoding.

Figure 11:
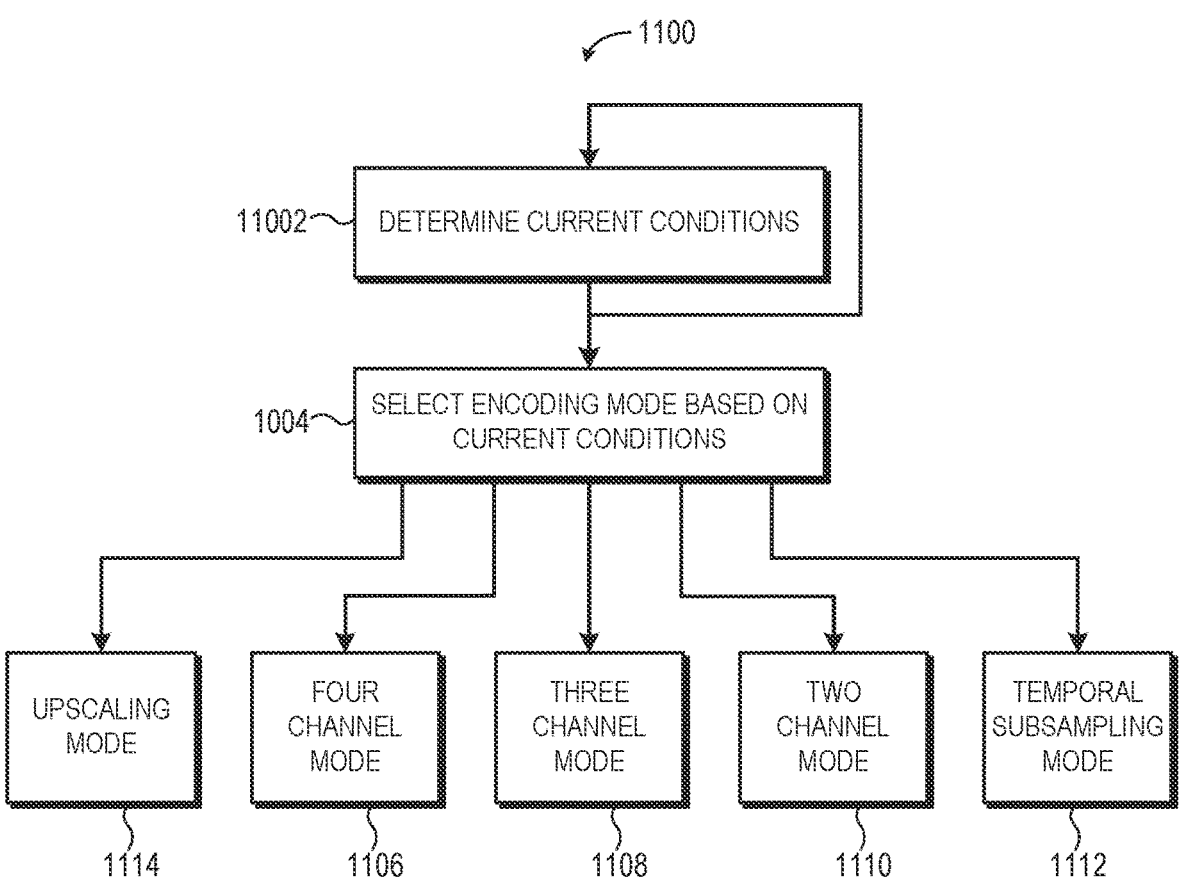
FIG. 11 is a flow diagram illustrating a method for dynamic YUV encoding mode switching in the video system of FIG. 1 in accordance with some embodiments.

FIG. 11 illustrates a method 1100 for dynamic adaptation of the YUV encoding mode employed in the video system 100 based on current conditions in accordance with some embodiments. As noted above, the chroma subsampling process can employ two, three, or four subframes depending on the capabilities of the encoder circuit 114 and the decoder circuit 116, and in some instances may utilize temporal subsampling as described above with reference to FIG. 10. In some implementations, these capabilities, as well as the capabilities of the transmission medium 106 and other components of the source device 102 and sink device 104 may change over time. Method 1100 illustrates a technique for dynamically adjusting the granularity or resolution of the YUV encoding mode to best suit the current conditions of the video system 100.

Accordingly, at block 1102 the source device 102 monitors the current conditions of the video system 100. These current conditions can include the current available processing resources of one or both of the source device 102 and the sink device 104 as they may impact the encoding process and decoding process, respectively, as well as the current conditions of the transmission medium 106 as it impacts the bandwidth or throughput of the transmission medium 106 for transmitting encoded data between the source device 102 and the sink device 104. The processing resources may include, for example, available processor resources, available battery resources, work job queue size, current processing latency, and the like. User preferences or other selection criteria, such as QoS requirements, likewise may be identified at block 1102.

At block 1104, the source device 102 selects from a plurality of YUV encoding modes the YUV encoding mode that appears to best suit the current conditions, preferences, and/or requirements determined at block 1002 and then configures the chroma preprocessing circuit 122 and encoder circuit 114 to implement the selected mode, as well as signals the sink device 104 to configure the chroma postprocessing circuit 124 and decoder circuit 116 to implement the selected mode for an upcoming period (e.g., a specified number of images in the video sequence, a specified time period, or until current conditions sufficiently change to trigger a mode change). For example, these YUV encoding modes can include the four subchannel chroma subsampling mode described above with reference to FIGS. 2-5 (block 1106), the three subchannel chroma subsampling mode described above with reference to FIGS. 6 and 7 (block 1108), the two subchannel chroma subsampling mode described above with reference to FIGS. 8 and 9 (block 1110), the temporal chroma subsampling mode described above with reference to FIG. 10 (block 1112), as well as a conventional upsampling mode (block 1114). In the conventional upsampling mode, the original UV plane is upsampled such that when it is chroma subsampled, the resulting subsampled UV plane has the original chroma resolution. However, while retaining the original chroma resolution in one stream, the conventional upsampling mode often is at risk of being unsupported by certain implementations due to their maximum resolution thresholds—that is, the UV plane cannot be sufficiently upsampled without exceeding a maximum image size set for the encoder. Moreover, the conventional upsampling mode lacks robustness as the sink device 104 cannot disregard the upsampled-resolution stream if they cannot decode it—that is, there is no fallback to recover a lower resolution version at the sink device 104 in the event that the upsampled version exceeds the sink device's capabilities.

To illustrate an operation of method 1100, assume the current capabilities indicate that the source device 102 presently has resources for encoding at a high resolution, the decoder has resources for decoding at a high resolution, and the current bandwidth of the transmission medium 106 is in excess of what is needed for any mode. In such an instance, the source device 102 may elect to implement either the conventional upsampling mode (block 1012) or implement the four subchannel mode (block 1006). In a similar situation but with an indication that either the encoder circuit 114 or the decoder circuit 116 are incapable of supporting the high resolution required for the conventional upscaling mode, then the four subchannel mode may be implemented for the upcoming period. However, should one or more of the source device 102, sink device 104, or transmission medium 106 be moderately resource-limited, then the source device 102 may signal a dynamic degradation to the three-channel mode (block 1108), which still provides greater than YUV 4:2:2 resolution. Further, should one or more of the source device 102, sink device 104, or transmission medium 106 report extensive limitations on resource availability, then the source device 102 may signal a dynamic degradation to the two-channel mode (block 1010) so as to conserve processing or transmission resources, while still providing higher than YUV 4:2:0 resolution.

Figure 12:
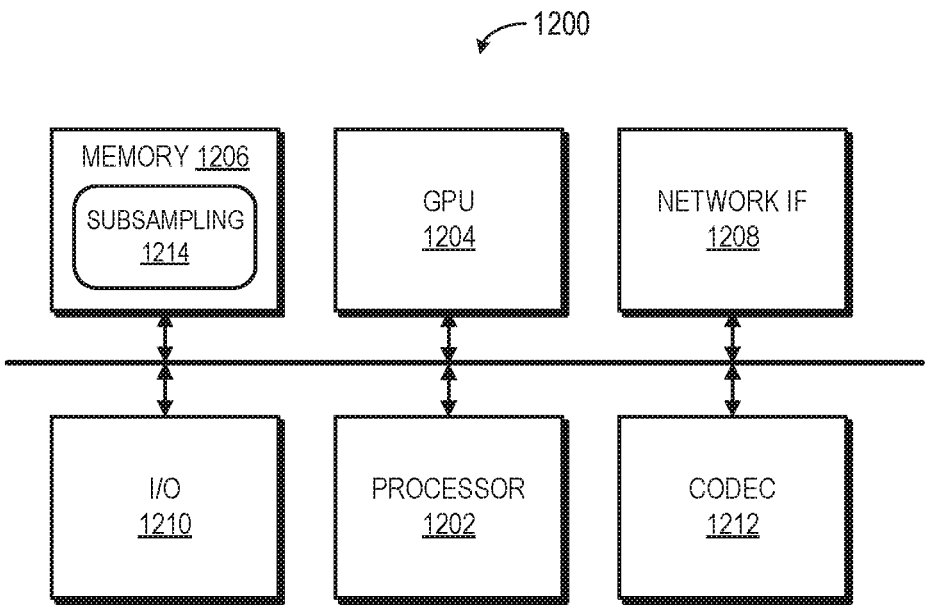
FIG. 12 is a block diagram of an example hardware configuration of a processing device that may be implemented as one or both of a source device or a sink device of the video system of FIG. 1 in accordance with some embodiments.

FIG. 12 illustrates an example hardware implementation of a processing system 1200 that may be implemented at one or both of the source device 102 or sink device 104 in accordance with some embodiments. The processing system 1200 includes one or more processors 12002, such as a central processing unit (CPU), one or more co-processors 1204 (or other hardware accelerators), such as a graphics processing unit (GPU), one or more memories 1206 (e.g., system memory, cache, hard disk drive, etc.), one or more network interfaces 1208 (e.g., a WLAN interface, an Ethernet interface, etc.), one or more input/output (I/O) devices 1210, such as a display, a keyboard, a touchscreen, and the like, and an encoder/decoder (codec) 1212, which represents the encoder circuit 114 in an implementation of the processing system 1200 as the source device 102 or represents the decoder circuit 116 in an implementation of the processing system 1200 as the sink device 104. The codec 1212 may be implemented as a hardware-based codec, such as an ASIC or hard-coded logic in a hardware accelerator, as a software-based codec, such as via software stored in the memory 1106 and executed by one or both of the processor 1202 or GPU 1204, or a combination thereof.

The one or more memories 1206 store one or more sets of executable code that, when executed, cause the one or more processors 1202 and/or the one or more co-processors 1204 to perform certain actions described above. To illustrate, in conjunction with execution of software instructions providing for an operating system (OS) and associated drivers, the processor 1202 and/or co-processor 1204 may execute subsampling software 1214 stored in the memory 1206 and which cause the processor 1202 and/or co-processor 1204 to implement the operation of the chroma preprocessing circuit 122 or implement the operation of the chroma postprocessing circuit 124. For example, the subsampling software 1214 may be implemented as part of an application programming interface (API) or other interface layer between the OS and the codec 1212, and thus serving to provide YUV 4:4:4 support for a codec 1212 that only natively supports sub-4: 4:4 encoding/decoding, using the techniques described above.

In some embodiments, the apparatus and techniques described above are implemented in a system including one or more integrated circuit (IC) devices (also referred to as integrated circuit packages or microchips), such as the source device 102 or sink device 104 described above with reference to FIGS. 1-11. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
generating, at a first device, a plurality of subframes for an input image of a video stream, each subframe including a same luminance plane of the input image and a different subset of a chrominance plane of the input image, each subset obtained by sampling the chrominance plane with a sampling position offset relative to sampling positions of other subframes of the plurality of subframes;
encoding, at the first device, each subframe of the plurality of subframes to generate a plurality of bitstreams; and
transmitting the plurality of bitstreams for receipt by a second device.

2. The method of claim 1, wherein generating the plurality of subframes comprises:
for each subframe:
generating a corresponding chrominance plane portion from the chrominance plane of the input image, wherein the corresponding chrominance plane portion of a subframe is offset by one pixel one or both of vertically or horizontally relative to other chrominance plane portions; and
performing a chrominance subsampling process on the corresponding chrominance plane portion to generate a corresponding subset of the chrominance plane.

3. The method of claim 2, wherein:
the plurality of subframes is four subframes;
a chrominance plane portion of a first subframe comprises an entirety of the chrominance plane;

a chrominance plane portion of a second subframe comprises all but a top row of the chrominance plane;
a chrominance plane portion of a third subframe comprises all but a leftmost column of the chrominance plane; and
a chrominance plane portion of a fourth subframe comprises all but the top row and leftmost column of the chrominance plane.

4. The method of claim 1, wherein:
each of a first subframe, second subframe, third subframe, and fourth subframe of the plurality of subframes has a separate one-fourth of the chrominance plane.

5. The method of claim 1, wherein:
the plurality of subframes is three subframes;
a chrominance plane portion of a first subframe of the three subframes comprises a first subset of chrominance values of the chrominance plane;
a chrominance plane portion of a second subframe of the three subframes comprises a first set of blended chrominance values, each blended chrominance value of the first set comprises a blending of a chrominance value of a second subset of chrominance values of the chrominance plane with an adjacent chrominance value in a third subset of chrominance values of the chrominance plane;
a chrominance plane portion of a third subframe of the three subframes comprises a second set of blended chrominance values, each blended chrominance value of the second set comprises a blending of a chrominance value of the second subset of chrominance values of the chrominance plane with an adjacent chrominance value in a fourth subset of chrominance values of the chrominance plane; and
wherein each of the first subset, second subset, third subset, and fourth subset are different from each other.

6. The method of claim 1, further comprising:
decoding, at the second device, the plurality of bitstreams to generate a plurality of decoded subframes;
generating a luminance plane of an output image using the luminance plane from one of the decoded subframes; and
compositing a chrominance plane of the output image using subsets of the chrominance plane of the input image from the plurality of decoded subframes.

7. The method of claim 6, wherein:
the output image has a same chrominance resolution as the input image; and
one or both of an encoder of the first device or a decoder of the second device requires chrominance subsampling of an input image.

8. A method comprising:
receiving, at a first device, a plurality of bitstreams representative of an input image of a video stream from a second device, each bitstream including a luminance plane of the input image and a different subset of a chrominance plane of the input image, each subset obtained by sampling the chrominance plane with a sampling position offset relative to sampling positions of other bitstreams of the plurality of bitstreams;
decoding, at the first device, the plurality of bitstreams to generate a plurality of decoded subframes;
generating, at the first device, a luminance plane of an output image using the luminance plane from one of the decoded subframes; and compositing, at the first device, a chrominance plane of the output image using the subsets of the chrominance plane of the input image from the plurality of decoded subframes.

9. The method of claim 8, wherein decoding the plurality of bitstreams comprises:

selectively disabling decoding of one or more bitstreams of the plurality of bitstreams based on one or more current conditions of one or more of the first device, the second device, or a transmission medium connecting the first device and the second device.

10. The method of claim 9, wherein:

selectively disabling decoding of one or more bitstreams comprises disabling decoding of a first bitstream of the plurality of bitstreams; and compositing the chrominance plane comprises interpolating a subset of the chrominance plane of the input image that is included in the first bitstream from one or more other subsets of the chrominance plane obtained from the plurality of decoded subframes.

11. The method of claim 8, wherein:

the plurality of bitstreams is four bitstreams; and each bitstream of the four bitstreams includes a separate one-fourth of the chrominance plane of the input image.

12. The method of claim 8, wherein:

the plurality of bitstreams is three bitstreams;

a chrominance plane portion of a first bitstream of the three bitstreams comprises a first subset of chrominance values of the chrominance plane of the input image;

a chrominance plane portion of a second bitstream of the three bitstreams comprises a first set of blended chrominance values, each blended chrominance value of the first set comprising a blending of a chrominance value of a second subset of chrominance values of the chrominance plane of the input image with an adjacent chrominance value in a third subset of chrominance values of the chrominance plane of the input image; and a chrominance plane portion of a third bitstream of the three bitstreams comprises a second set of blended chrominance values, each blended chrominance value of the second set comprising a blending of a chrominance value of the second subset of chrominance values of the chrominance plane of the input image with an adjacent chrominance value in a fourth subset of chrominance values of the chrominance plane of the input image.

13. The method of claim 12, wherein compositing the chrominance plane comprises:

for every 2×2 array of the chrominance plane of the output image:

setting a first position of the 2×2 array to a corresponding chrominance value from the first subset of chrominance values;

setting a second position of the 2×2 array to a corresponding blended chrominance value of the first set of blended chrominance values;

setting a third position of the 2×2 array to a corresponding blended chrominance value of the second set of blended chrominance values; and setting a fourth position of the 2×2 array to a blending of the blended chrominance value in the second position and the blended chrominance value in the third position.

14. A method comprising:

generating, at a first device, a plurality of bitstreams for an input image of a video stream, each bitstream resulting in part from a chrominance subsampling process at the first device and comprising a complete copy of a luminance plane of the input image and a different subsampled portion of a chrominance plane of the input image, each subsampled portion obtained from a sampling position offset relative to portions included in other bitstreams of the plurality of bitstreams, such that the plurality of bitstreams collectively include an entire chrominance plane of the input image; and generating, at a second device, an output image representative of the input image by generating a luminance plane of the output image from the complete copy of the luminance plane extracted from a decoding of one of the bitstreams and by compositing a chrominance plane of the output image from the different subsampled portions of the chrominance plane extracted from decoding of each of the plurality of bitstreams.

15. A device comprising:

an encoder circuit configured to perform chrominance subsampling and then image encoding on each subframe input to the encoder circuit; and a preprocessing circuit configured to generate a plurality of subframes from an input image of a video stream and provide the plurality of subframes as inputs to the encoder circuit, each subframe including a luminance plane of the input image and a different portion of a chrominance plane of the input image, each portion obtained from a sampling position offset relative to portions of the chrominance plane included in other subframes of the plurality of subframes.

16. The device of claim 15, further comprising an interface to transmit a plurality of bitstreams generated by the encoder circuit from the plurality of subframes for receipt by another device.

17. The device of claim 16, wherein the different portion of the chrominance plane of the input image included in a subframe is offset by one pixel one or both of vertically or horizontally relative to other portions of the chrominance plane of the other subframes.

18. The device of claim 17, wherein:

the plurality of subframes is four subframes;

a chrominance plane portion of a first subframe comprises an entirety of the chrominance plane;

a chrominance plane portion of a second subframe comprises all but a top row of the chrominance plane;

a chrominance plane portion of a third subframe comprises all but a leftmost column of the chrominance plane; and a chrominance plane portion of a fourth subframe comprises all but the top row and leftmost column of the chrominance plane.

19. The device of claim 15, wherein:

the plurality of subframes is three subframes;

a portion of the chrominance plane of a first subframe of the three subframes comprises a first subset of chrominance values of the chrominance plane;

a portion of the chrominance plane of a second subframe of the three subframes comprises a first set of blended chrominance values, each blended chrominance value of the first set comprises a blending of a chrominance value of a second subset of chrominance values of the chrominance plane with an adjacent chrominance value in a third subset of chrominance values of the chrominance plane;

a portion of the chrominance plane of a third subframe of the three subframes comprises a second set of blended chrominance values, each blended chrominance value of the second set comprises a blending of a chrominance value of the second subset of chrominance values of the chrominance plane with an adjacent chrominance value in a fourth subset of chrominance values of the chrominance plane; and wherein each of the first subset, second subset, third subset, and fourth subset are different from each other.

20. A device comprising:

a decoder circuit configured to decode a plurality of bitstreams to generate a plurality of decoded subframes, each bitstream including a luminance plane of an input image of a video stream and a different subset of a chrominance plane of the input image, each subset obtained by sampling the chrominance plane with a sampling position offset relative to sampling positions of other bitstreams of the plurality of bitstreams; and a postprocessing circuit configured to generate a luminance plane of an output image using the luminance plane from one of the decoded subframes and to composite a chrominance plane of the output image using the subsets of the chrominance plane of the input image from the plurality of decoded subframes.

21. The device of claim 20, wherein the decoder circuit is configured to selectively disable decoding of one or more bitstreams of the plurality of bitstreams based on one or more current conditions of one or more of the device, a device that transmitted the plurality of bitstreams, or a transmission medium used to transmit the plurality of bitstreams.

22. The device of claim 21, wherein:

the decoder circuit is configured to selectively disable decoding of a first bitstream of the plurality of bitstreams; and the postprocessing circuit composites the chrominance plane based in part on interpolating a subset of the chrominance plane of the input image that is included in the first bitstream from one or more other subsets of the chrominance plane obtained from the plurality of decoded subframes.

23. The device of claim 20, wherein:

the plurality of bitstreams is three bitstreams;

a first bitstream of the three bitstreams comprises a first subset of chrominance values of the chrominance plane of the input image;

a second bitstream of the three bitstreams comprises a first set of blended chrominance values, each blended chrominance value of the first set comprising a blending of a chrominance value of a second subset of chrominance values of the chrominance plane of the input image with an adjacent chrominance value in a third subset of chrominance values of the chrominance plane of the input image; and a third bitstream of the three bitstreams comprises a second set of blended chrominance values, each blended chrominance value of the second set comprising a blending of a chrominance value of the second subset of chrominance values of the chrominance plane of the input image with an adjacent chrominance value in a fourth subset of chrominance values of the chrominance plane of the input image.

24. The device of claim 23, wherein the postprocessing circuit is configured to composite the chrominance plane by:

for every 2×2 array of the chrominance plane of the output image:

setting a first position of the 2×2 array to a corresponding chrominance value from the first subset of chrominance values;

setting a second position of the 2×2 array to a corresponding blended chrominance value of the first set of blended chrominance values;

setting a third position of the 2×2 array to a corresponding blended chrominance value of the second set of blended chrominance values; and setting a fourth position of the 2×2 array to a blending of the blended chrominance value in the second position and the blended chrominance value in the third position.

25. A method comprising:

generating, at a first device, a first set of subframes for a first image, each subframe comprising a same luminance plane of the first image and a different subset of a chrominance plane of the first image, wherein the first set of subframes together have less than all of the chrominance plane of the first image;

encoding the first set of subframes into a first set of bitstreams and transmitting the first set of bitstreams to a second device;

generating, at the first device, a second set of subframes for a second image, each subframe comprising a same luminance plane of the second image and a different subset of a chrominance plane of the second image, wherein the second set of subframes together have less than all of the chrominance plane of the second image; and encoding the second set of subframes into a second set of bitstreams and transmitting the second set of bitstreams to the second device.

26. The method of claim 25, further comprising:

decoding the first set of bitstreams to generate a third set of subframes;

decoding the second set of bitstreams to generate a fourth set of subframes; and generating a third image representative of the second image using luminance information from the fourth set of subframes, chrominance information from the fourth set of subframes, and chrominance information from the third set of subframes.

* * * * *